United States Patent [19]
Christensen

[11] Patent Number: 6,036,840
[45] Date of Patent: Mar. 14, 2000

[54] METHOD AND A REACTOR FOR ELECTROCHEMICAL CONVERSION OF A MATERIAL E.G. SOOT PARTICLES BEING INSOLUBLE IN A FLUID

[75] Inventor: Henrik Christensen, Fredericia, Denmark

[73] Assignee: Dinex A/S, Middelfart, Denmark

[21] Appl. No.: 09/195,906

[22] Filed: Nov. 19, 1998

Related U.S. Application Data

[63] Continuation of application No. PCT/DK97/00229, May 20, 1997.

[60] Provisional application No. 60/035,449, Jan. 16, 1997.

[30] Foreign Application Priority Data

May 20, 1996 [DK] Denmark ................................. 0587/96

[51] Int. Cl.[7] ..................................................... C02F 1/461
[52] U.S. Cl. .......................... 205/746; 205/747; 205/758; 205/763; 205/765; 204/275; 204/277; 204/559; 204/560; 204/563; 204/571; 204/573
[58] Field of Search ..................................... 205/746, 747, 205/758, 763, 765; 204/275, 277, 559, 560, 563, 571, 573

[56] References Cited

U.S. PATENT DOCUMENTS

| | | |
|---|---|---|
| 4,310,406 | 1/1982 | Smith et al. . |
| 4,902,487 | 2/1990 | Cooper et al. ........................ 423/215.5 |
| 4,927,511 | 5/1990 | Friehmelt et al. ....................... 204/151 |
| 4,946,609 | 8/1990 | Pruess et al. ............................. 252/35 |
| 5,022,975 | 6/1991 | Gordon .................................... 204/277 |

FOREIGN PATENT DOCUMENTS

| | | |
|---|---|---|
| 29237 | of 0000 | Chile . |
| 0 317 816 | 5/1989 | European Pat. Off. . |
| 0 577 026 | 1/1994 | European Pat. Off. . |
| 0 627 263 | 12/1994 | European Pat. Off. . |
| 0 532 031 B1 | 2/1996 | European Pat. Off. . |
| 42 36 711 | 5/1993 | Germany . |
| WO 94/16204 | 7/1994 | WIPO . |
| WO 94/25642 | 11/1994 | WIPO . |
| WO 95/02117 | 1/1995 | WIPO . |

*Primary Examiner*—Arun S. Phasge
*Attorney, Agent, or Firm*—Finnegan, Henderson, Farabow, Garrett & Dunner, L.L.P.

[57] ABSTRACT

A method and a reactor for electrochemical conversion of a material (21) being insoluble in a fluid into a material being soluble in the fluid, which method comprises that a flow of the fluid is passed to a reaction zone which comprises an internal circuit consisting of: one or more working electrodes (12), one or more counter-electrodes (13), and one or more ion-selective electrolytes (11), and which internal circuit is applied with an electrical voltage difference sufficient for the electrochemical processes; and use thereof for removal of soot particles from flue gasses and removal of oil in waste water.

51 Claims, 15 Drawing Sheets

METHOD AND A REACTOR FOR ELECTROCHEMICAL CONVERSION OF A MATERIAL E.G. SOOT PARTICLES BEING INSOLUBLE IN A FLUID

This application is based on U.S. provisional Ser. No. 60/035,449 filed on Jan. 16, 1997 and a continuation of PCT/DK97/00229, filed May 20, 1997. This application is a continuation of International Application No. PCT/DK97/00229, filed May 20, 1997.

1. BACKGROUND OF THE INVENTION

The present invention relates to a method for electrochemical conversion of a material being insoluble in a fluid into a material being soluble in the fluid; an electrochemical reactor; an ion-selective electrolyte, an electrode, and a mixed ion-selective electrolyte, and electrode material for use when carrying out the method and for use in the electrochemical reactor, and use of the method and for use of the reactor for removal of soot particles from flue gases and oil in waste water.

The Technical Field

Methods for removal of e.g. soot particles from flue gases, such as exhaust gases from diesel engines, today take place by combustion, which typically is based on a pure chemical/catalytic combustion process of soot particles collected on special filters. It is a drawback of the chemical/catalytic processes that they do not proceed at sufficiently high velocity at temperatures below 400° C., which is higher than the temperature of typically about 300° C. which normally is obtainable in the exhaust system of a big diesel engine. The efforts to obtain as high efficiency as possible for the combustion system or the engine at the same time pulls in the direction of as low a temperature of the flue gases as possible being obtained. Partially combusted material and soot particles are consequently accumulated in the filter, for which reason it must periodically be regenerated in order to remove or combust the soot particles collected. The regeneration must typically be performed at intervals of a few hours, i.e. several times during a service day for e.g. a bus. The regeneration is typically initiated by heating the filter with a burner or an electrical heating element. In the course of the regeneration period, the exhaust gas flow must be bypassed the filter unit, whereby the exhaust gas is not filtered. Alternatively the engine may be stopped during the regeneration period. A regeneration typically takes from a few minutes up to 20 minutes. As the filter is loaded during the service period, the counter pressure increases because of the clogging. This has an unfavourable influence on the operation of the engine Furthermore, there is a high risk that overheating of the filter unit occurs as a consequence of the heat generation from the combustion of the carbon collected. This leads to a risk of melt-down or cracking because of thermal stresses in the ceramic filter material which is most commonly used.

Description of Prior Art Techniques

EP 532 031 discloses a burner system based on diesel fuel for regeneration of filters for the collection of particulate material from the exhaust gases from diesel engines. The collected material is ignited by heating with a burner. The system has the drawback that it cannot be operated on a continuous basis.

WO 95/02 117 discloses a filter for collection of particulate materials from the exhaust from a diesel engine. This filter is regenerated by heating the filter body electrically to the ignition temperature of the soot collected. Alternatively, a diesel fuelled burner can be used to initiate the ignition of the particulate material. This system is not a continuously functioning system, since periodically it must be taken out of service for regeneration.

WO 94/16 204 discloses a filter system, primarily for use on the exhaust from forklifts and other diesel fuelled vehicles which are not intended for street use. The regeneration of the filter is accomplished in a set-up where air for the combustion and electrical power for heating the collected material to its ignition temperature are supplied from an external source. Thus, the vehicle must be out of service, while the regeneration takes place.

U.S. Pat. No. 4,946,609 discloses a system where the temperature for the catalytic combustion is lowered by means of addition of an additive to the fuel or the lubricating oil. Hereby the filter should be self-cleaning at about 300° C. The system is, however, complicated by the fact that a dosing mechanism for the additive must be introduced. Besides, there is potentially increased risk of clogging of the filter due to residues of the additive, and there is risk of environmental external contamination due to release of additive.

U.S. Pat. No. 4,902,487 discloses a filter system, in which a relatively high content of nitrogen oxides is required in the exhaust gas. These oxides serve as an active oxidizing agent, whereby the minimum temperature for the catalytic combustion of soot particles can be lowered. However, in order to obtain self-cleaning of the filter at temperatures over 275° C., a suitably high proportion of content of nitrogen oxides to the amount of soot is necessary. Thus, the system only functions in systems with low soot content in the exhaust gas and being well maintained. Furthermore, the exhaust gas is discharged with an undesirably high content of nitrogen oxides.

U.S. Pat. No. 4,310,406 describes a system in which a granulate of carbon or the like is used as electrode in electrochemical purification of waste water, wherein an electrochemical reaction is utilized to convert a pollutant in solution, essentially metal ions, into an insoluble, particulate material which is collected on the electrode material. The opposite process, in which an insoluble material is converted into a soluble material, is neither shown nor suggested.

German patent DE 42 36 711 A1 discloses a measuring device for monitoring soot content in an exhaust gas. This device is based on an electrochemical measuring cell with an oxide ion conducting electrolyte and metallic or ceramic working- and reference electrodes. The device measures the electrical potential difference caused by the soot deposited on the working electrode and no soot at the reference electrode. The device must be heated to a constant temperature. The device does not convert the soot into a soluble material which is removed by the exhaust gas.

2. DESCRIPTION OF THE INVENTION

It is the object of the present invention to provide an improved method and an apparatus for conversion of a material being insoluble in a fluid into a material being soluble in the fluid.

In particular it is the object to provide such a method and apparatus by which carbon-containing soot particles being insoluble in an flue gas can be converted into carbon dioxide.

Further, it is in particular the object to provide such a method and apparatus, by which oil droplets dispersed in water can be converted into carbon dioxide and water.

Method for Electrochemical Conversion of a Material Being Insoluble in a Fluid According to one aspect of the invention these objects are achieved by providing a method for electrochemical conversion of a material being insoluble in a fluid into a material being soluble in the fluid, the method being characterized in comprising:

(a) that a flow of the fluid is conducted to a reaction zone comprising an internal circuit, which comprises, or in a preferred embodiment consists of:

(i) one or more working electrodes capable of transferring electrons to and/or from one or more electrochemical processes, which convert the insoluble material into the material being soluble in the fluid.

(ii) one or more counter-electrodes capable of transferring electrons to and from one or more electrochemical processes, which counterbalance the electrochemical processes at the working electrode, and (iii) one or more ion-selective electrolytes, which selectively conduct one or more types of ions between the electrochemical processes at the working electrode and at the counter-electrode, in which reaction zone the insoluble material is introduced into one or more open and throughgoing cavities in the electrodes and electrolytes and brought within an electrochemical reaction distance from the working electrode so that the electrochemical processes can take place, and the said internal circuit via the working electrode and the counter-electrode being connected to an external current source, (b) that the internal circuit via the external current source is applied with an electrical voltage difference, which is sufficient for the electrochemical processes to convert the material being insoluble in the fluid into the material being soluble in the fluid, and (c) that the material being soluble in the fluid is conducted away from the reaction zone with the flowing fluid.

By the method according to the invention it is achieved, that the material being insoluble in the fluid is made to participate in one or more electrochemical processes, whereby it is converted electrochemically into a material being soluble in the fluid, which is subsequently conducted away with the flowing fluid.

Such a method has a large number of advantages, e.g. that the conversion can be performed at a lower temperature than in conventionally used combustion techniques, that addition of undesired additives to the insoluble material is avoided, and that addition of undesired nitrogen oxides to the fluid is avoided.

Furthermore, the electrochemical conversion according to the invention is continuous, whereby undesired service-stops, which are necessary with the known techniques in order to regenerate the collection filters used, are avoided.

Likewise it is an advantage that the energy consumption by the electrochemical conversion is low. Preferred embodiments of the method are stated in the claims.

The Internal Circuit

According to the invention a flow of the fluid is passed to a reaction zone, which comprises an internal circuit consisting of one or more working electrodes, one or more counter-electrodes, and one or more ion-selective electrolytes, whereby it is accomplished that one or more types of ions, which are produced either at the working electrode or at the counter-electrode, can be transported through the ion-selective electrolyte, while the electrons are conducted to and/or pumped electrically from the external current source.

The Working Electrode

Examples of working electrode according to the invention are electrodes which are capable of transferring electrons to and/or from one or more electrochemical processes, which are capable of converting the insoluble material into a material being soluble in the fluid.

Such electrodes are known to the skilled person, and can be made for example as described in: "Handbook of Batteries and Fuel Cells" Ed.: David Linden, McGraw-Hill, 1984.

According to one embodiment it is preferred that the working electrode comprises an electrically conducting material, such as a metallic material. In particular a metallic material including transition metals is preferred, preferably transition metals belonging to group 8 in the periodic table. In particular it is preferred that the metallic material is selected from the platinum group metals Ni, Pt, Rh and Pd, and alloys hereof, by which it is obtained that the working electrode has good catalytic effect towards many kinds of electrochemical reactions oxidations as well as reductions.

According to another embodiment it is preferred that the working electrode consists of a ceramic material, such as e.g. perovskites. Ceramic materials are cheap electrode materials which exhibit specific electrocatalytic properties towards specific reactions, and possess good chemical stability under oxidizing conditions whereby it is obtained that the working electrode can be produced in well characterized ceramic substances with specific properties.

In particular it is preferred that the working electrode consists of a ceramic material comprising a doped perovskite structure ($ABO_3$), such as lanthanum manganite doped with strontium, lanthanum cobaltite doped with strontium, lanthanum ferrite doped with strontium, or mixtures hereof, whereby it is achieved that electrodes can be produced with specific properties as regards conductivity and electrocatalytical activity towards specific reactions, in particular reactions in which oxygen participates.

The working electrode may for example be prepared by powder metallurgy from metal powder with well defined particle size, typically slightly bigger than a preferred average pore size. Pressing and sintering are controlled during the preparation to the effect that the final structure reaches a suitable mechanical stability, while a preferred porosity is maintained.

The working electrode may also be prepared by applying the preferred pigment in powder form. The application can be performed by painting, screen printing or other serigraphic techniques. After the application, the electrode can be sintered, whereby binder and solvent are pyrolyzed or combusted. By adequate control of the sintering conditions, a metallic structure with a preferred porosity is obtained.

In stead of metallic powder, use may also be made of metal oxide powder, which after application is reduced to free metal by heating in a hydrogen containing atmosphere.

In stead of pores, the working electrode may have cavities in the form of openings or machined holes, prepared by known techniques, such as lithographic etching techniques, water jet bombardment, or laser erosion. The counter-electrode is also provided with suitable cavities, such as pores or machined holes, which allows a preferred flow of the flue gas through the reaction zone.

The Working Electrode Acts as Anode

The electrochemical processes at the working electrode are defined by whether the working electrode acts as anode or cathode, and by which kind or kinds of ions are conducted to the working electrode by the ion-selective electrolyte(s).

When the working electrode acts as anode, an oxidation of the insoluble material RED to a soluble material OX takes place. In this conversion the insoluble material is considered to be in a reduced form RED, which by the oxidation is oxidized to an oxidized form OX.

In preferred embodiments of the invention, the ion-selective electrolytes consist of an oxygen ion conductor or a hydrogen ion conductor, respectively. In these embodiments it is assumed that the oxidation of RED to OX takes place in accordance with the following general reaction equations:

Oxygen ion conductor: $RED + nO^{2-} = OX + 2ne^-$

Hydrogen ion conductor: $RED + nH_2O = OX + 2ne^- + 2nH^+$

The Working Electrode Acts as Cathode

When the working electrode acts as cathode, a reduction takes place of the insoluble material OX to the soluble material RED, which in the preferred embodiments mentioned analogously are assumed to take place in accordance with the following general reaction equations:

Oxygen ion conductor: $OX + 2ne^- = RED + nO^{2-}$

Hydrogen ion conductor: $OX + 2nH^+ + 2ne^- = RED + nH_2$

It should be noted that the skilled person as a matter of course will be able to set up reaction equations for analogous electrochemical oxidations and reductions in which ions other than oxygen ions and hydrogen ions are conducted selectively between the working electrode and the counter-electrode by other ion-selective electrolytes depending on the preferred electrochemical processes.

The Counter-electrode

Examples of counter-electrode according to the invention are electrodes which are capable of transferring electrons to and/or from one or more electrochemical processes, which counterbalance the electrochemical processes at the working electrode.

Such electrodes are known to the skilled person. They can be identical to or different from the working electrode, and they may consist of the same materials as mentioned for the working electrode. In such cases the working electrode and the counter-electrode are designated electrode materials.

In a preferred embodiment, the counter-electrode consists of platinum, whereby a particularly chemically and thermally stable counter-electrode is obtained.

The Counter-electrode Acts as Cathode

When the counter-electrode acts as cathode, the electrochemical processes at the counter-electrode include processes by which the counter-electrode transfers electrons to one or more of the participating reactants.

In the preferred embodiments, in which the ion-selective electrolyte is an oxygen ion conductor or a hydrogen ion conductor, it is assumed that oxygen is reduced to oxygen ions, or reduced to water, in accordance with the following reaction equations.

Oxygen ion conductor: $n/2 O_2 + 2ne^- = nO^{2-}$

Hydrogen ion conductor: $n/2 O_2 + 2nH^+ + 2ne^- = nH_2O$

The Counter-electrode Acts as Anode

When the counter-electrode acts as anode, the counter-electrode receives electrons from one or more of the participating reactants. In the preferred embodiments mentioned, in which the ion-selective electrolyte is an oxygen ion conductor or a hydrogen ion conductor, it is assumed that oxygen ions are oxidized to oxygen, or water is oxidized to oxygen and hydrogen ions, in accordance with the following reaction equations:

Oxygen ion conductor: $nO^{2-} = n/2 O_2 + 2ne^-$

Hydrogen ion conductor: $n\, H_2O = n/2 O_2 + 2nH^+ + 2ne^-$

It should be mentioned that the skilled person as a matter of course will be able to set up reaction equations for analogous electrochemical reductions and oxidations at the counter-electrode in which ions other than oxygen ions and hydrogen ions are conducted selectively between the working electrode and the counter-electrode by other ion-selective electrolytes depending on the preferred electrochemical processes.

The Ion-selective Electrolyte

Examples of ion-selective electrolyte according to the invention are electrolytes which selectively conduct one or more kinds of ions between the electrochemical processes at the working electrode and at the counter-electrode, whereby it is achieved that the ions participating in the processes, such as for example oxygen ions $O_{2-}$ and hydrogen ions $H^+$ as mentioned above, can be conducted from one electrode, where they are produced, to another electrode, where they are consumed.

Not considering the accidentally present ions, it is the ion-selective electrolyte which defines which ions can take part in the electrochemical processes at the working electrode and the counter-electrode, respectively.

If an oxygen ion-conducting ion-selective electrolyte is selected, an electrochemical oxidation of carbon to carbon dioxide is assumed to take place at the working electrode, which acts as anode, an electrochemical reduction of oxygen to oxygen ions at the counter-electrode, which acts as cathode, and a transport of oxygen ions from the counter-electrode (the cathode) through the oxygen ion-conducting ion-selective electrolyte to the working electrode (the anode), where the oxygen ions will react with carbon under release of electrons to the anode in accordance with the following reaction equations:

with oxygen ion-conducting electrolyte:

| Anode: | $C + 2O^{2-} =$ | $CO_2 + 4e^-$ |
| Cathode: | $O_2 + 4e^- =$ | $2O^{2-}$ |
| Total: | $C + O_2 =$ | $CO_2$ |

If a hydrogen ion-conducting ion-selective electrolyte is selected, an electrochemical oxidation of carbon to carbon dioxide is assumed to take place at the working electrode (the anode) under production of hydrogen ions. These will be conducted through the hydrogen ion-conducting ion-selective electrolyte to the counter-electrode (the cathode), where they will react with oxygen under formation of water in accordance with the following reaction equations:

with hydrogen ion-conducting electrolyte:

| Anode: | $C + 2H_2O =$ | $CO_2 + 4H^+ + 4e^-$ |
|---|---|---|
| Cathode: | $O_2 + 4H^+ + 4e^- =$ | $2H_2O$ |
| Total: | $C + O_2 =$ | $CO_2$ |

In both cases the oxygen ions and hydrogen ions produced are conducted through the ion-selective electrolyte, while the electrons are conducted or pumped electrically through an external electrical circuit.

When use is made of a hydrogen ion-conducting electrolyte it is necessary to apply water to maintain the reactions. If the water is not already present in the fluid, it is consequently necessary to add it. Water will typically be present from the combustion process of carbon containing materials.

Suitable electrolytes are known to the skilled person, see for example: B.C.H. Steele: Oxygen Ion Conductors and Their Technological Applications. Solid State Ionics Symposium, E-MRS Conference on Advanced Materials (ICAM 1991) Strasbourg, France, May 27–31, 1991.

Examples of oxygen ion-conducting ion-selective electrolytes are for example doped oxides with fluorite structure, preferably based on zirconium dioxide, $ZrO_2$, cerium dioxide, $CeO_2$, or thorium dioxide, $ThO_2$, where the doping with a metal oxide with lower valence introduces vacancies on the oxygen sites in the lattice structure.

Specific examples include zirconium dioxide doped with yttrium oxide, or cerium dioxide doped with gadolinium oxide.

Other examples are doped oxides based on bismuth oxide, $Bi_2O_3$, doped perovskites, in particular based on barium cerate, $BaCeO_3$, and barium thorate, $BaThO_3$.

Furthermore, oxides with brownmillerite structure ($A_2B_2O_5$) based on transition metals and the rare earth metals can be mentioned.

Finally another class of doped perovskites, doped $LaGaO_3$ is mentioned by H. L. Tuller: Ionic and Mixed Conductors: Materials Design and Optimization. High Temperature Electrochemistry: Ceramics and Metals, Proceedings of the $17^{th}$ Rise International Symposium of Materials Science, Denmark Sep. 2–6, 1996.

Examples of hydrogen ion-conducting ion-selective electrolytes are perfluorated sulphonate polymers, such as NAFION, see J. Kjær et al., Solid State Ionics, 46, (1991), 164–173.

Furthermore, doped strontium- and barium cerates, see for example T. Yajima, H. Iwahara, Solid State Ionics, 47, (1991), 117–124, can be mentioned.

Also perovskite, such as doped barium thorate, and tin substituted mordenite, β"-alumina, and NASICON can be mentioned.

Mixed Selective Electrolyte and Electrode Material

In a preferred embodiment the internal circuit consists of one or more working electrodes, one or more counter-electrodes and one or more ion-selective electrolytes provided in a mixed electrolyte and electrode material.

The mixed electrolyte and electrode material is characterized in that it is produced by a method comprising mixing an ion-selective electrolyte material having a particle size of 10–100 μm with an electrode material with a particle size of 1–10 μm and in a proportion which allows the electrode material particles to be positioned essentially on the surface of the ion-conducting electrolyte material particles without touching each other, so that an electrical conductivity of the mixed material is achieved which is of the same order of magnitude as the conductivity of the ion-conducting electrolyte material.

Hereby it is achieved that the material being insoluble in the fluid can be collected and converted everywhere in the internal circuit, whereby especially compact electrochemical reactors with high conversion capacity per reactor volume are obtainable.

Generally, the mixed electrolyte and electrode material contains so much electrode material that a sufficient number of contact points, at which the electrochemical reaction can take place, are achieved. Generally, the material contains less than 25 vol.-%, since higher amounts could cause direct electrical contact between the electrode material particles and thereby cause electronic short-circuiting in the material.

It is preferred that the material contains 3–15 vol.-% of the electrode material, whereby it is achieved that the electrode material is positioned as discrete particles on the surface of the electrolyte material particles, and that there is no electrical contact between the electrode material particles. Such direct electrical contact would lead to an electrical short-circuiting between the electrode particles and would prevent the electrochemical reactions from taking place.

Examples of mixed electrolyte electrode material are such materials which have open cavities of a size which allows the insoluble material to penetrate into them.

It is preferred that the cavities have a size of 10–100 μm.

Materials with Decreasing Pore Size

In a particularly preferred embodiment the mixed electrolyte and electrode material in the direction of one of its extensions has a decreasing pore size of 100 μm–10 μm, whereby it is obtained that both big solid and liquid particles of the insoluble material and medium sized and small particles can be converted effectively and at the same time in the same flow direction of the fluid.

For example, by orienting the material with decreasing pore size in the flow direction of the fluid, the big particles will first be converted in the big pores, whereafter the medium sized and small particles will be converted in the subsequent smaller pores.

Materials with decreasing pore size can be produced in manners well known to the skilled person, such as for example by construction of a layered structure with stepwise jumps or smooth transitions in the pore size.

Ion-selective Electrolyte Absorbed in Inert Material or Bound in a Gel

An example of ion-selective electrolyte is also a liquid electrolyte absorbed in a porous, inert material which liquid electrolyte is capable of selectively conducting the preferred ions, or an electrolyte in the form of a gel with the preferred physical shape and pore structure.

The Electrochemical Reaction Distance

According to the invention the insoluble material introduced is brought within an electrochemical reaction distance from the working electrode, in such a way that the electrochemical reactions can take place. Hereby it is ensured that the insoluble material can be converted according to the preferred electrochemical processes if sufficient energy in the form of a sufficient electrical potential on the working electrode is supplied to the processes.

According to the invention "the electrochemical reaction distance" means the distance within which transfer of electrons and ions between the working electrode and the insoluble material and between the ion-selective electrolyte and the insoluble material, respectively, provides a suitable reaction rate of the preferred electrochemical reaction(s).

A typical electrochemical reaction distance, which gives a suitable reaction rate, is a distance less than 10 $\mu$m, preferably 1–10 $\mu$m, by which conversion rates of 1–10 mg carbon per sec per $m^2$ reactor area, is achieved, i.e. the macroscopic exposed working electrode area. The reactor area is typically smaller than the total porous working electrode area.

Open Cavities

It is preferred that the reaction zone comprises one or more open cavities comprising one or more closed delimitations and one or more openings, which openings communicate with the fluid, whereby it is achieved that the material being insoluble in the fluid can penetrate into the cavities, within which it is trapped and converted.

It is preferred that the closed delimitations of the cavity consist of one or more electrode materials, one or more ion-selective electrolyte materials or mixtures hereof, examples of electrode materials being both working electrode and counter-electrode materials, whereby an especially effective ion transfer from the ion-selective electrolyte to the cavity, in which the electrochemical conversion takes place, is obtainable.

In a particularly preferred embodiment the closed delimitations of the cavity consist of a mixed ion-selective electrolyte and electrode material.

Open cavities can in general be provided in a manner known per se to the skilled person. Examples include mechanical, chemical or optical preparation of network, bores, pores or other openings with smooth or irregular surfaces. But other ways of preparation may be a possibility.

As regards chemical preparation methods mention can especially be made of controlled sintering as described by R. J. Brook (ed.): "Concise Encyclopaedia of Advanced Ceramic Materials", Pergamon Press, Series on: Advances in Material Science and Engineering, 1991.

Controlled sintering can be used in the manufacture of both metallic (powder metallurgy) and ceramic structures. The most important parameter is the particle size of the raw powder. The larger the particle size, the larger the pore size will be in the final structure. In addition, the sintering temperature is used as control parameter. Normally, it is aimed at by sintering to reach a dense, pore-free structure, but by using raw powder having comparatively big particle size, e.g. obtained by pre-heating the powder to a temperature near the normal sintering temperature (calcination), it is obtainable that the powder does not sinter to a dense structure, but leaves pores in the structure. The pore size can, besides by the particle size, also within wide limits be controlled by means of the sintering conditions, because reduction of the sintering temperature and the sintering time in general will increase the porosity. Finally, the porosity can be affected by addition of a pore-former, i.e. an additive which is added during the shaping of the ceramic structure, but which evaporates or burns during the sintering, and thus leaves pores in the structure. As suitable pore-former use can be made of organic materials, such as wax, polymers, fibre materials or other materials.

Size and Number of Cavities

Size and number of cavities can be chosen in a manner known per se to the skilled person, the size of the cavities being chosen in such a way that particles having a preferred size will be trapped in the cavities, and the number of cavities being chosen in such a way that a preferred surface area of the electrode and consequently a preferred conversion capacity of the reaction zone are obtained.

In general, the open cavities have a size which allows the material being insoluble in the fluid to penetrate into them. From an average view it applies that the average cavity size must be a little bigger or of the same order of magnitude as the mean particle diameter of the insoluble material.

The size of the cavities is typically in the range 10–100 $\mu$m, whereby it is obtained that the fluid can pass into and optionally through the cavities, while the material being insoluble in the fluid is trapped, so that it can be converted.

The trapping of the material being insoluble in the fluid for example takes place by adsorption of the insoluble material on the walls of the cavity, whereby in particular particles having significantly smaller size than the size of the opening can be trapped and converted.

The trapping can also be effected in that the size of the openings decreases either continuously or discontinuously, for example by stacking several electrode materials in continuation of each other, in such a way that the insoluble material is trapped in the openings, while the fluid flows on.

For electrochemical conversion of soot particles from diesel exhaust gas it is preferred that the cavity size lies within the range 1–50 $\mu$m, preferably 1–10 $\mu$m.

The External Circuit

According to the invention the internal circuit is, via the working electrode and the counter-electrode, coupled to an external current source, thus allowing exchange of electrons between the current source and the internal circuit.

Examples of current source are current sources which are known to the skilled person, for example standard current sources which are controlled and regulated in such a way that they are capable of delivering a predefined voltage and capable of keeping this voltage constant, even if the current level changes within wide limits.

It is preferred that the external circuit is capable of bringing about exchange of electrons between the current source and the internal circuit via leads, but inductive exchange is also a possibility.

The current source can be a direct current source or an alternating current source.

In one embodiment the exchange of electrons between the current source and the internal circuit takes place in one current direction, by which it is achieved that the working electrode and the counter-electrode have a constant polarity, and that at all times they act as either anode or cathode. Consequently, different electrochemical reactions can take place at the two electrodes, whose conditions it is possible to optimize.

In another embodiment the exchange of electrons between the current source and the internal circuit takes place in alternating current directions, by which it is achieved that the working electrode and the counter-electrode change their polarity with the same frequency as the current source, and thus alternatingly act as anode and cathode. The electrochemical conversion will therefore be able to take place at both electrodes, and the effective working electrode area for the electrochemical conversion of the material being insoluble in the fluid can be increased. In this embodiment it is preferred that the working electrode and the counter-electrode are identical.

When use is made of an alternating current source, the frequency is typically within the range from 1 to 1000 Hz, preferably from 10 to 100 Hz, whereby it is obtained that no permanent changes or polarizations would occur which could reduce the efficiency of the electrodes along with time.

Applied Electrical Voltage Difference

According to the invention the internal circuit is via the external current source applied with a voltage difference which is sufficient for the electrochemical processes to convert the material being insoluble in the fluid into the material being soluble in the fluid.

According to the invention a "sufficient voltage difference" means a voltage which exceeds the sum of the electrochemical potential for the preferred electrochemical reaction plus a possible overvoltage, which is necessary to overcome a polarization resistance corresponding to the activation energy for the reaction.

For an internal circuit comprising a layered structure of a working electrode, an ion-selective electrolyte and a counter-electrode it is preferred that the voltage is within the range from 1 to 25 volts, preferably from 1 to 5 volts.

For an internal circuit comprising a mixed ion-selective electrolyte and electrode material it is preferred that the voltage is within the range from 5 to 500 volts, preferably from 10 to 100 volts.

The current depends on the size of the reaction zone. It is typically in the range from 1 to 1000 mA/cm$^2$ reaction zone area, preferably from 10 to 100 mA/cm$^2$.

The Material Being Insoluble in the Flowing Fluid

Examples of the material being insoluble in the flowing fluid and of the flowing fluid are one ore more two-phase systems, in which one phase makes up the flowing fluid in the form of a gas or a liquid, and in which the other phase makes up a material, in the form of a solid or a liquid, being insoluble in the flowing fluid.

It is preferred, that the two-phase system is chosen from liquid-in-gas, such as aerosols and clouds of oil-in-air, solid-in-gas, such as smoke consisting of carbon containing dust-in-air, or mixtures of these; solid-in-liquid, such as suspensions of carbon-containing material-in-water, and liquid-in-liquid such as emulsions of oil-in-water, or mixtures of hereof.

In a special embodiment the material being insoluble in the fluid consists of soot, and the fluid consists of the exhaust gas from an internal combustion engine.

In another special embodiment the material being insoluble in the fluid consists of oil, and the fluid consists of waste water.

The Fluid

Examples of the fluid are fluids which acts as inert carriers of the insoluble material, or such which further completely or partly contain substances which can be converted electrochemically, such as gaseous hydrocarbons, e.g. unburnt hydrocarbons from internal combustion engines.

Temperature

The electrochemical conversion can be performed within a very wide temperature range. In general the reaction rate increases with increasing temperature, for which reason a high temperature will be advantageous. Many electrochemical reactions will, however, be able to proceed at a sufficient rate already at room temperature.

When as ion-selective electrolyte use is made of an oxygen ion-conductor of a ceramic material, the useable temperature range will be limited by the ion conductivity of the electrolyte material. For this reason the ion conductivity increases strongly with the temperature. This means that the lower limit for reactors based on for example doped cerium oxide will typically be about 200° C., the conductivity being between $10^{-4}$ and $10^{-5}$ s/cm. At temperatures over about 800° C. a significant electronic conductivity is induced, which will act as a short-circuiting of the reactor, and thus strongly reduce the efficiency of the electrochemical conversion.

By selecting other types of ion-selective electrolytes, both higher and lower temperatures are possible.

Pressure Range

The pressure used in the reactor can be within wide limits. The conversions shown in the examples have been performed at gas and liquid pressure close to atmospheric pressure. However, nothing prevents use of both higher and lower pressure.

By removal of soot particles from the exhaust gas from a diesel engine, the counter pressure over the internal circuit should not exceed about 30 mbar, as a higher counter pressure will have a negative influence on the engine performance.

Start-up

The electrochemical conversion can start immediately by connecting the voltage simultaneously with the introduction of the fluid being started. Thus, it is not a matter of a real start-up procedure. In some cases the activity will, however, not reach full level until the reactor temperature has reached the same temperature as the flowing fluid.

Electrochemical Reactor for Conversion of a Material being Insoluble in a Fluid

In another aspect of the invention the objects of the invention are obtained by providing an electrochemical reactor for conversion of a material being insoluble in a fluid into a material being soluble in the fluid, which reactor is characterized in that it comprises:

a reaction chamber with an inlet for introduction of a fluid, and an outlet for discharge of the fluid introduced, in which reaction chamber a reaction section is situated which comprises an internal circuit comprising, or in a preferred embodiment, consisting of:

(a) one or more working electrodes capable of transferring electrons to and/or from one or more electrochemical processes, which convert the insoluble material into a material being soluble in the fluid, (b) one or more counter-electrodes capable of transferring electrons to and/or from one or more electrochemical processes, which counter-balance the electrochemical processes at the working electrode, and (c) one or more ion-selective electrolytes which selectively conduct one or more types of ions between the electrochemical processes at the working electrode and at the counter-electrode, in which reaction section the insoluble material is introduced into one or more open and through-going cavities of said electrodes and electrolytes and brought within an electrochemical reaction distance from the working electrode, so that the electrochemical processes can proceed, and which internal circuit via the working electrode and the counter-electrode is coupled to an external current source.

Preferred embodiments of constructing the reactor are stated in the claims.

Further Advantages

By the method and the reactor according to the invention a number of other advantages are obtained over the prior art.

For example, the reactor for removal of soot particles from flue gases is self-cleaning at temperatures over about 250° C.; there is no requirement as to addition of potentially harmful and cost increasing additives to fuel or lubricating oil, and the reactor works independently of the content of nitrogen oxides in the flue gas. Similarly, the reactor will be able to function within very wide limits of the soot content and size of the soot particles. Furthermore, the reactor does not need to be taken out of service periodically for regeneration. The temperature in the filter is comparatively constant. It will only vary slightly with the temperature of the flue gas introduced, but not reach high, potentially hazardous levels caused by a regeneration cycle. The pressure drop over the reactor is also constantly low and will not increase because of an accumulation of soot particles.

It is a further advantage that the electrochemical conversion is started in that the flue gas is introduced simultaneously with the current being switched on. Thus there is no need first to preheat the reactor in order for it to function.

The reactor is free of maintenance in the sense that the possibly clogging material in the cavities in time will be converted and carried away with the fluid.

It is also an advantage that the reactor can be constructed as a comparatively small compact reactor, as no space and filter capacity are needed for accumulated soot. This results in smaller material consumption and consequently a cheaper reactor. The smaller physical size further makes it easier to fit the reactor into the exhaust system for the flue gas in an existing system, for example the exhaust system of a diesel-powered vehicle.

It also is an advantage that other electrochemically convertible substances dissolved in the fluid can be converted.

3. SHORT DESCRIPTION OF THE DRAWINGS

The invention is explained in more detail in the following, reference being made to the drawings in which FIG. 1 shows a schematic cross-section of an embodiment of an electrochemical reactor according to the invention, FIG. 2 shows an enlarged view of the rectangular section II shown in FIG. 1, FIG. 3 shows an enlarged view of the circular section III shown in FIG. 2, FIGS. 4, 5 and 6 show schematic alternative embodiments of the working electrode and the ion-selective electrolyte, FIG. 7 shows a schematic representation of an embodiment of the internal circuit comprising a porous mixed ion-selective electrolyte and electrode material, FIG. 8 shows a schematic representation of an embodiment of the internal circuit shown in FIG. 7, where the porous mixed ion-selective electrolyte and electrode material is carried by a porous inert carrier, FIG. 9 shows a microphotograph taken with a scanning electron microscope of an electrochemical reactor constructed according to the principle shown in FIG. 7, FIG. 10 shows a schematic representation of an embodiment of the internal circuit, in which the reaction section is constructed of a layered structure consisting of 3 layers, each having the structure shown in FIG. 7, FIG. 11 shows the measured generation of carbon dioxide as function of the applied direct voltage over an internal circuit corresponding to that shown in FIG. 4, FIG. 12 shows the measured generation of carbon dioxide as function of the applied direct voltage over an internal circuit corresponding to that shown in FIG. 7;

4. DETAILED DESCRIPTION OF THE INVENTION

Figure 1:
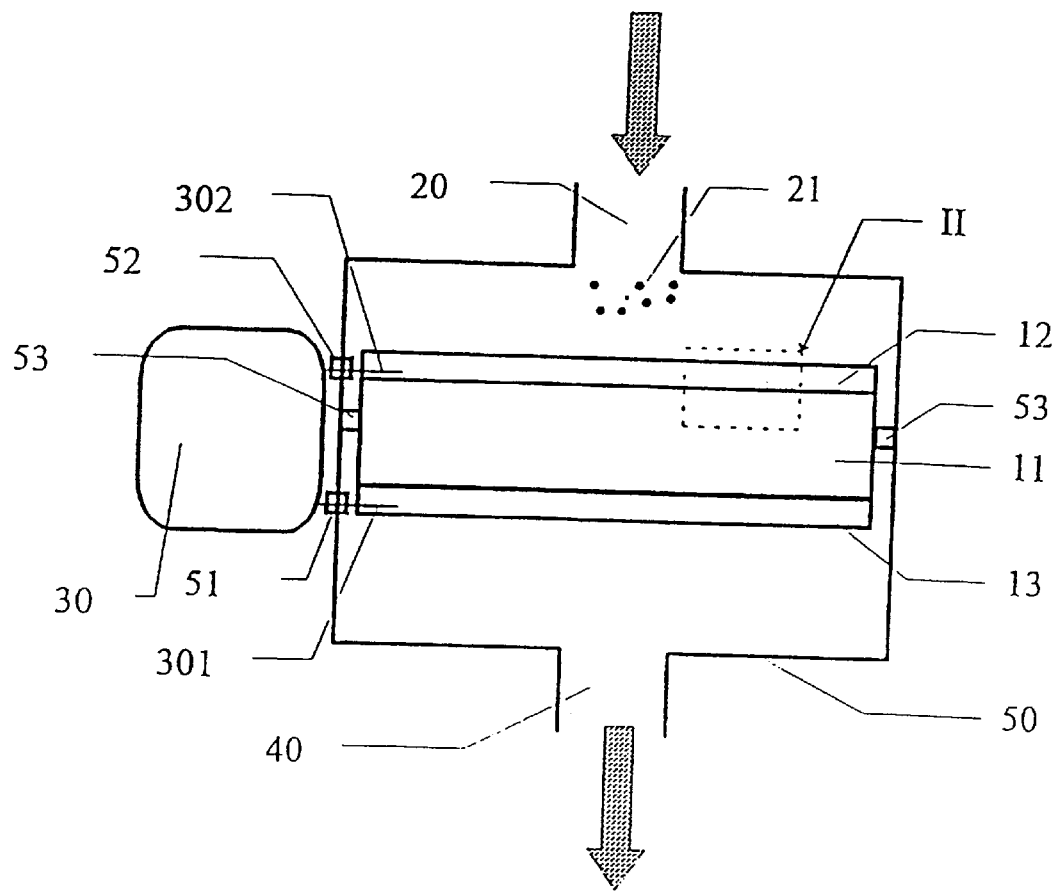

FIG. 1 shows a schematic cross-section of an embodiment of an electrochemical reactor according to the invention.

The electrochemical reactor comprises a reaction chamber 50, which can be made of metal sheet or the like. The chamber is provided with an inlet 20 for introduction of a fluid containing a material 21 being insoluble in the fluid. The chamber is furthermore provided with an outlet 40 for discharge of the fluid which contains the converted material.

An internal circuit is situated in the reaction chamber, which circuit is suspended electrically insulated from the chamber by insulating suspensions 53, which at the same time shuts off the fluid flow. The internal circuit consists of a working electrode 12, a counter-electrode 13, and an ion-selective solid-state electrolyte 11 which selectively is capable of conducting ions between the working electrode and the counter-electrode.

An exhaust gas from an internal combustion engine, and the unburnt carbon-containing material, primarily in the form of soot particles 21, in the exhaust gas are passed into the reactor through the inlet 20 (shown by the upper arrow), whereafter the exhaust gas and the converted material are conducted out through the outlet 40.

The Working Electrode and the Counter-electrode

In the embodiment shown, the working electrode 12 and the counter-electrode 13 are different, but they may be identical.

The working electrode consists of a 0,05–1 mm thick porous metallic layer with a number of pores and pore sizes ensuring a sufficiently large surface area and allowing passage of particles having the preferred size. By scanning electron microscopy, the working electrode typically had a pore size of 20–40 $\mu$m and a pore density of 1000 pores per cm: working electrode area.

The Ion-selective Electrolyte

The ion-selective electrolyte is a porous solid-state oxygen ion-conductor of cerium oxide doped with 20% gadolinium oxide delivered from Seattle Speciality Ceramics, Seattle, USA (now: Praxair Specialty Ceramics). The material was calcined at 1550° C. for 3 hours, which resulted in a particle size of 5–10 $\mu$m, which after pressing and sintering at 1500° C. resulted in a pore size of 1–10 $\mu$m.

In an alternative embodiment, which is not explained in more detail here, the ion-selective electrolyte was a solid-state hydrogen ion-conductor of sulphonated perfluoropolymer delivered under the trade mark Nafion® from the company DuPont and with a pore size of 1–10 µm.

External Current Source

In the embodiment shown, the internal circuit is via leads 301 and 302 connected to a current source 30, which either may be a direct current source or an alternating current source. The leads 301 and 302 are taken through the chamber wall via insulated feed throughs 51 and 52.

In the embodiment disclosed herein, the current source is a direct current source, where the working electrode acts as a positive anode, and the counter-electrode is a negative cathode.

If the current source is an alternating current source, the working electrode and the counter-electrode will in principle be identical-and act alternatingly as anode and cathode with a frequency corresponding to the frequency of the alternating current. The electrochemical reactions will be the same as when the current source is a direct current source.

The voltage difference over the working electrode and the counter-electrode is chosen in such a way that there is sufficient activation energy for the preferred electrochemical processes to take place. For an electrochemical reactor, the conversion of soot particles in a flue gas of the layered structure show, the voltage difference is generally higher than 1 volt, typically 5 volts, to obtain a satisfactory conversion rate.

Start-up and Operation

The reactor is started by introducing the flue gas into the inlet 20, and at the same time applying a voltage of 5 volts over the working electrode 12 and the counter-electrode 13. It is not required that the temperature of the reactor in advance has been brought up to for example 250–300° C., even though this would naturally be an advantage in order to get as high conversion rates as possible already from the start.

In operation, the flue gas is continuously passed to the inlet 20. The flue gas passes through openings 14 in the porous working electrode, whereby the soot particles 21 being insoluble in the flue gas, in the area in which the working electrode and the ion-selective electrolyte touches on each other, are brought within the electrochemical reaction distance from the working electrode. Within this distance, the soot particles react with oxygen ions, which are delivered by the ion-selective electrolyte, and the excess electrons are transferred to the working electrode. By participating in one or more electrochemical processes in one or more process steps, the soot particles are converted into carbon dioxide.

Residence Time and Cavity Size

In order to obtain a suitable residence time of the soot particles in the reaction zone, the size of the cavities in the ion-selective electrolyte is chosen in such a way that a suitable retention of the soot particles which pass through the openings in the working electrode to the electrolyte is achieved.

A preferred conversion rate for a given particle size distribution is achieved by choosing the number and size of the cavities in the working electrode in such a way that a suitably large surface area is obtained in the reaction zone in which the soot particles can exchange electrons with the working electrode, and in which they can react with the preferred ions delivered from the ion-selective electrolyte.

In order to be able to reach a sufficient conversion rate it might be an advantage to set up more internal circuits in series or in parallel.

After passage of the internal circuit, the insoluble soot particles are converted into carbon dioxide, which leaves the reactor with the flue gas 40.

Details of the Working Electrode

Figure 2:
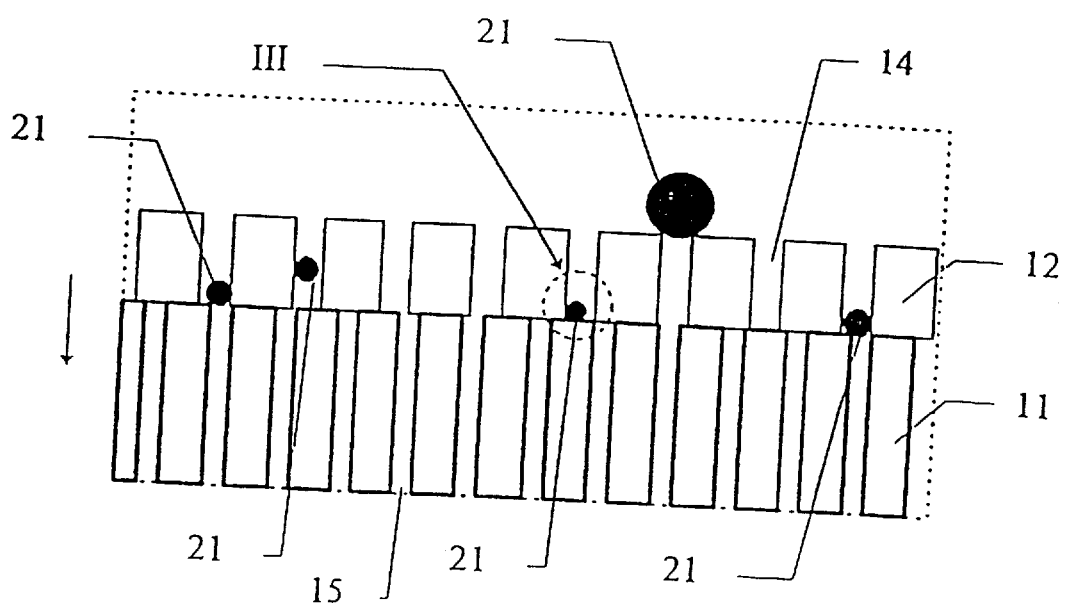

FIG. 2 shows an enlarged view of the rectangular section II shown in FIG. 1. Soot particles 21 of a suitable size penetrate into the pores 14 in the working electrode 12, where they are stopped by the smaller pores 15 in the electrolyte 11. The flue gas passes unhindered through the pores in the direction indicated by the arrow in both working electrode and in the ion-selective electrolyte. Soot particles 21, which are within the reaction distance from the working electrode, are converted with oxygen ions, delivered from the ion-selective electrolyte 11, under conversion into carbon dioxide, which is conducted away with the flowing fluid.

Soot particles having a size larger than the pore size in the working electrode cannot penetrate into the working electrode, and will therefore not be converted electrochemically.

Figure 3:
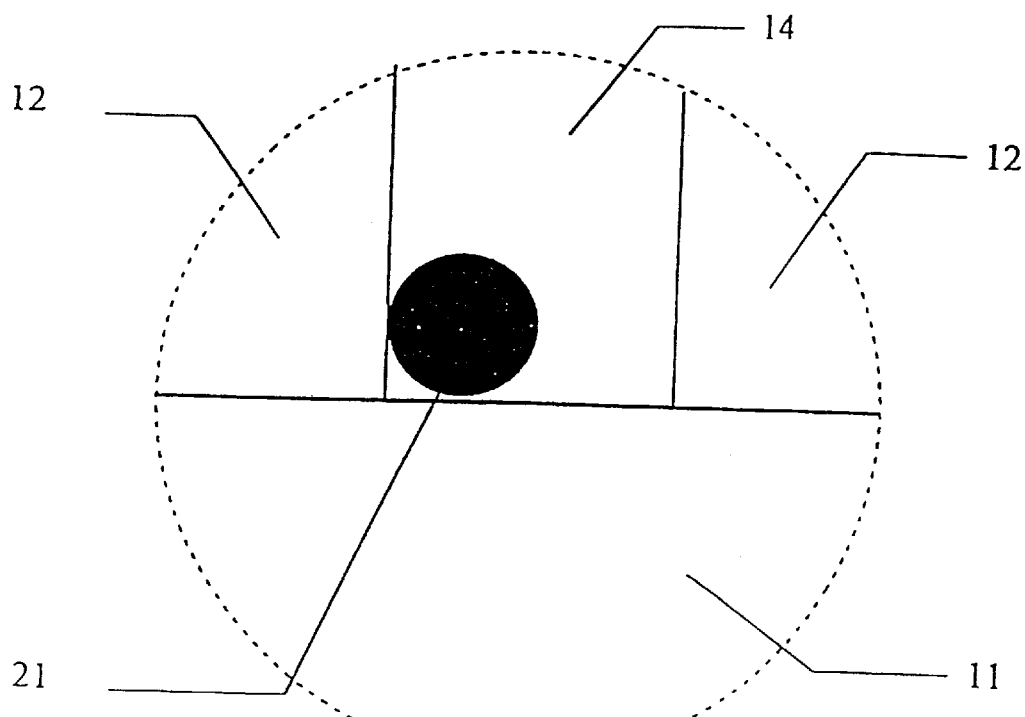

FIG. 3 shows an enlarged view of the circular section III shown in FIG. 2. A soot particle 21 is situated in a pore 14 of the working electrode 12, which touches on the ion-selective electrolyte 13, whereby the soot particle 21 is "caught" within an open cavity, the open delimitation of which communicates with the flue gas. The soot particle can hereby be converted electrochemically by exchange of electrons with the working electrode 12, oxygen ions with the electrolyte 11, and carbon dioxide with the flue gas within and outside the cavity.

If the oxygen content in the flue gas is very low, it might be necessary to add extra air, for example through a side channel in the chamber (not shown). Analogously, extra water or other reactants can be added, which originally are not present in sufficient amounts in the fluid.

Alternative Embodiments of the Internal Circuit

Figure 4:
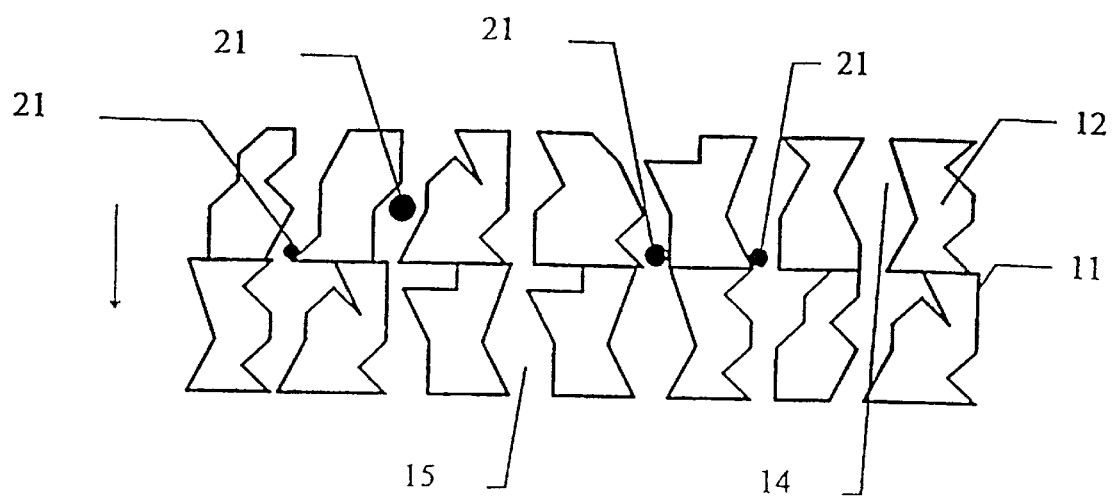
Figure 5:
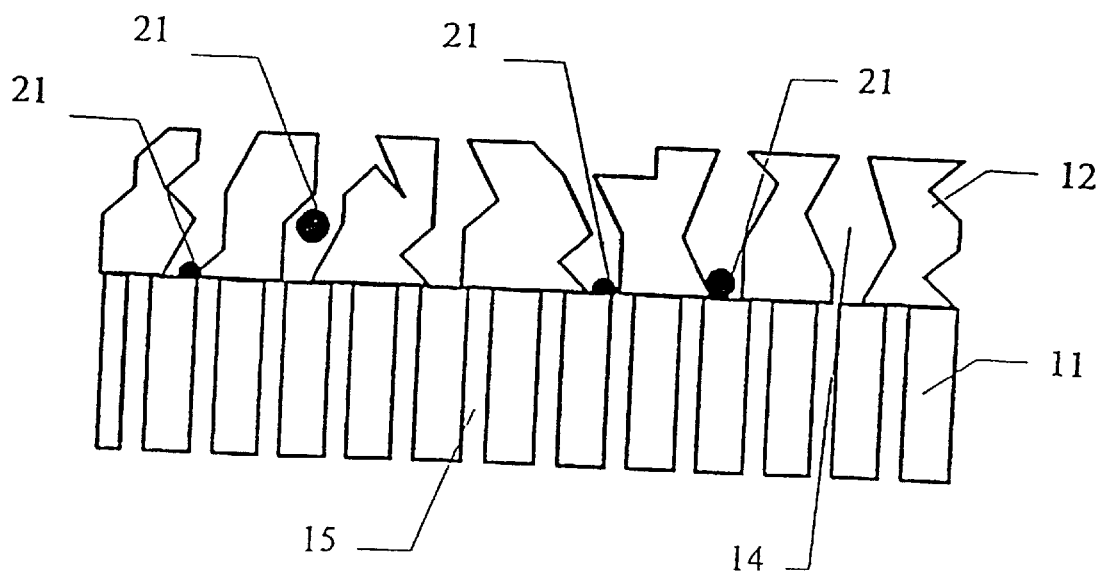
Figure 6:
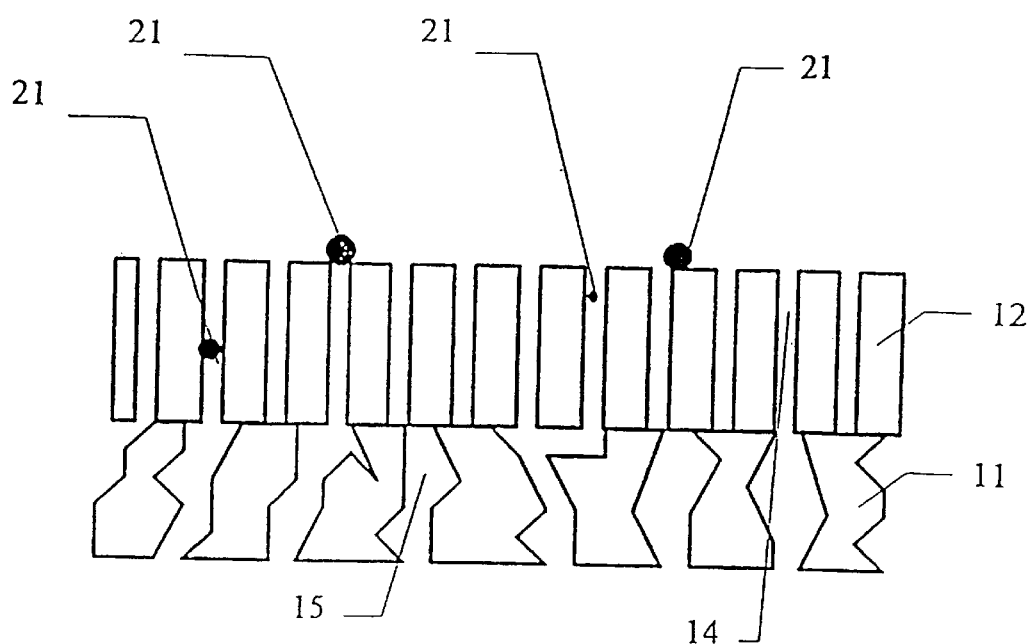

FIGS. 4, 5 and 6 show schematically alternative embodiments of the working electrode and the ion-selective electrolyte.

FIG. 4 shows an embodiment in which the working electrode 12 as well as the ion-selective electrolyte 11 have openings for conducting the fluid in the form of pores 14 and 15, which have uneven delimitations in stead of the comparatively straight channels shown in FIG. 2.

FIGS. 5 and 6 show two alternative embodiments of the working electrode and the ion-selective electrolyte, in which the delimitations of the cavities are uneven and straight, respectively.

Thus, it is within the scope of the invention that the most expedient configurations of the cavities can be chosen.

Mixed Ion-selective Electrolyte- and Electrode Material

Figure 7:
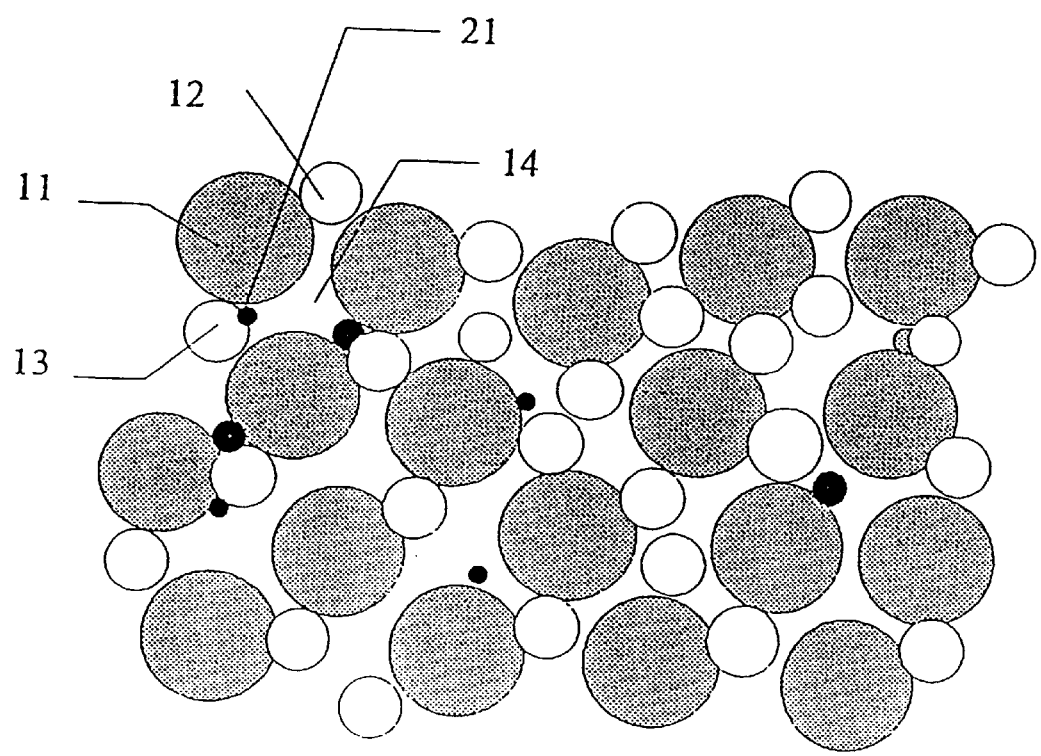

FIG. 7 shows a schematic view of an embodiment of the internal circuit which comprises a porous mixed ion-selective electrolyte and electrode material.

The internal circuit is constructed of comparatively large particles of the ion-conducting electrolyte 11 mixed with comparatively small particles of the working electrode material 12 and counter-electrode material 13, which here are shown as being identical. In principle the mixed ion-selective electrolyte and electrode material functions as a stack of small electrochemical reactors which are electrically connected in series and in parallel, and in which the working electrode particles 12 for a small reactor at the same time will act as counter-electrode particles 13 for another small reactor.

The soot particles 21 are trapped in the cavities 14 in the porous structure, in which they are converted electrochemically as described in the discussion of FIG. 3.

The flue gas and the converted soot particles, which are the product of the electrochemical conversion, can pass through the pores in the mixed structure.

Figure 8:
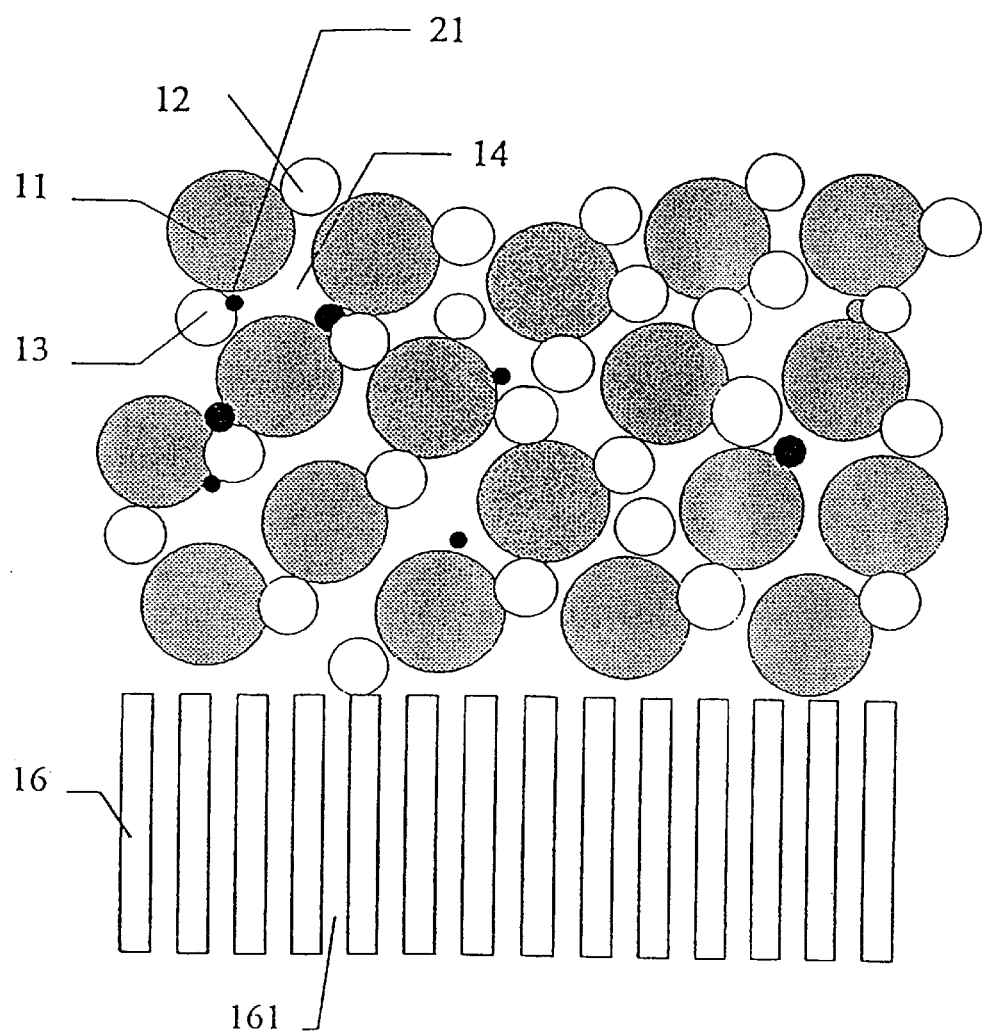

FIG. 8 shows a schematic view of an embodiment of the internal circuit, shown in FIG. 7, in which the porous mixed ion-selective electrolyte and electrode material is supported on a porous, inert carrier 16 with openings or channels 161 through which the fluid can be conducted away. The porous carrier material allows the fluid to pass, while it retains the insoluble material 21, which in this way can be converted electrochemically to soluble material in the reactive part of the reactor.

Figure 9:

FIG. 9 shows a microphotograph taken on a scanning electron microscope of an electrochemical reactor constructed according to the principle shown in FIG. 7. As ion-selective electrolyte material use has been made of cerium oxide doped with 20 atomic-% gadolinium oxide (CGO), which is an oxygen ion conductor, and as electrode material use is made of lanthanum manganite doped with 20 atomic-% strontium oxide (LSM).

Figure 10:
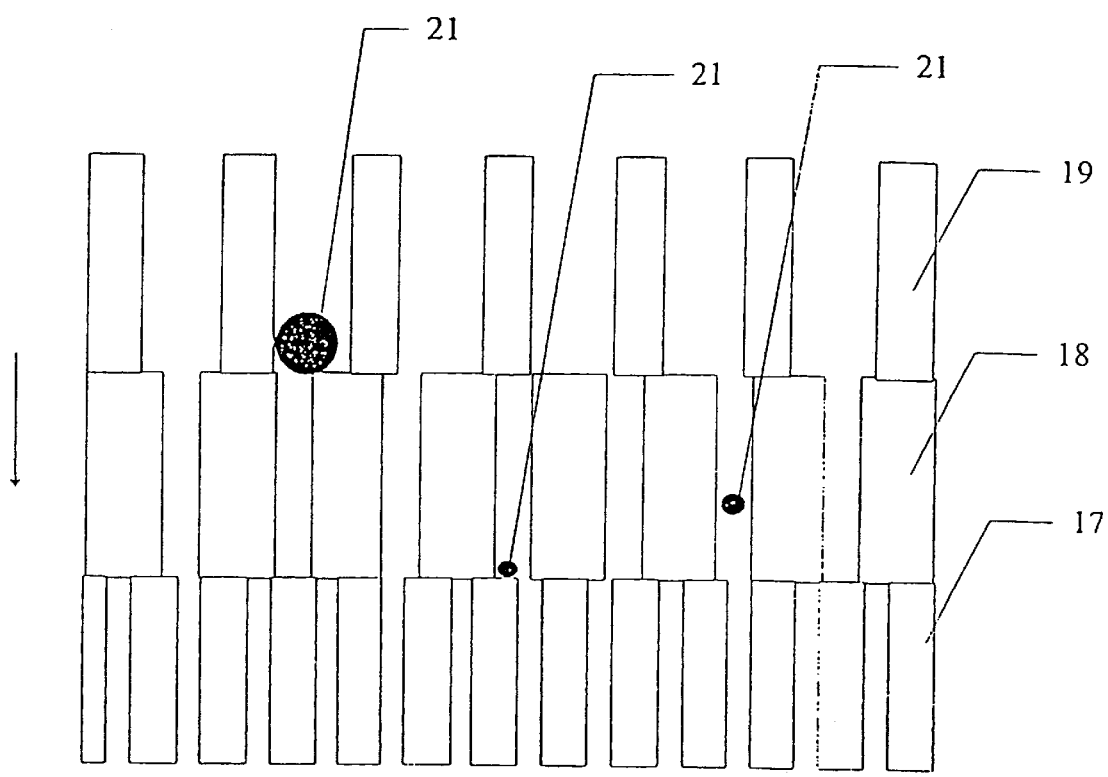

FIG. 10 shows a schematic view of an embodiment of the internal circuit, in which the reaction section is constructed of a layered structure of three layers, each having the structure described in FIG. 7. In the lowermost layer 17, the average pore size is so small that the smallest particles of the insoluble material are trapped and converted electrochemically. The intermediate layer 18 has a somewhat larger pore size, which allows the smallest particles 21 to penetrate the structure, while the larger particles are trapped. The largest particles are converted in the upper layer 19, which has a large pore size.

Such a layered structure can be constructed using raw powders with different particle size in the various layers. When a larger particle size is chosen in the raw material, the pore size in the final structure gets larger.

The layered structure of the internal circuit can be composed of fewer than as well as more than three layers.

5. EXAMPLES

Example 1

Electrochemical Reactor with Internal Circuit Constructed as a Sandwich Structure of Working Electrode, Ion-selective Electrolyte, and Counter-electrode To illustrate the invention, an ion-selective electrolyte was produced from cerium oxide doped with 20 atomic-% gadolinium oxide (hereinafter designated CGO) from Seattle Specialty Ceramics, Seattle, USA (now: Praxair Specialty Ceramics). The particle size of the powder was adjusted by heat treatment at 1550° C. for 3 hours, whereby an average particle size of the powder of 5–10 $\mu$m was obtained. The measuring of the particle size was made by electron scanning microscopy. The powder was pressed to a plate with a thickness of 1.5 mm at 100 MPa and sintered at 1500° C. for one hour. The porous ion-selective electrolyte hereby obtained was provided with porous platinum electrodes by painting with a brush with a platinum paste delivered under the trade mark Demetron® M8005, Degussa, Germany, whereafter the ion-selective electrolyte with electrodes was sintered at 800° C. for one hour. The pore size of both electrodes and the ion-selective electrolyte was 0.5–5 $\mu$m.

The internal circuit hereby constructed was provided with leads on the electrodes, connected to a laboratory current source of brand Danica TPS 23A, ±30 V, 2 A, regulated voltage.

The complete set-up was then placed in a furnace and heated to about 300° C. in a gas flow of 20% oxygen in nitrogen, to which was added carbon black of the type Printex® L delivered from Degussa, Germany.

Figure 11:
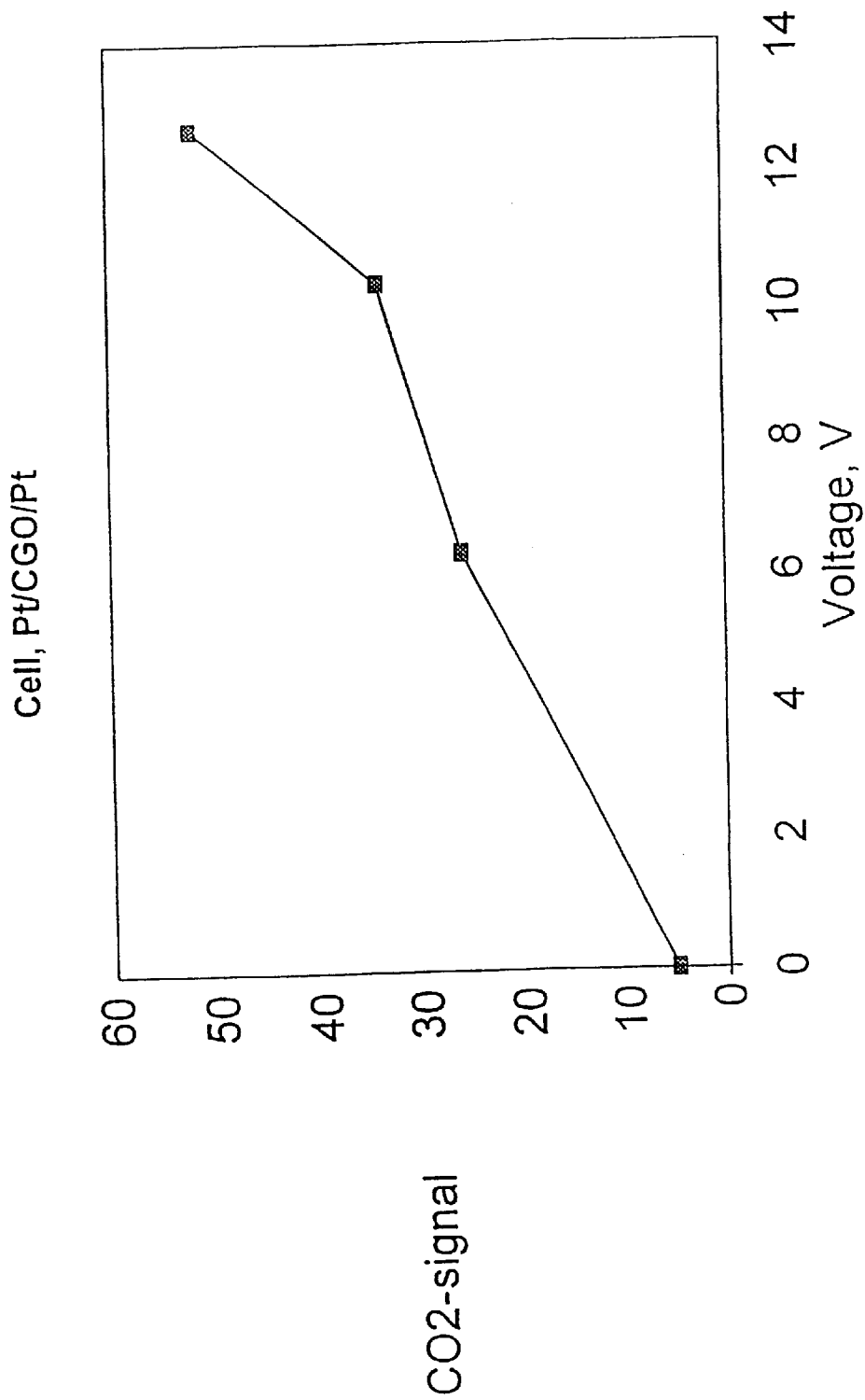

FIG. 11 shows the measured generation of carbon dioxide as function of the applied direct voltage over an internal circuit. The porous, layered structure which corresponds to the structure shown in FIG. 4.

The data shown have been measured with a mass spectrometer in the outlet flow, corresponding to the outlet 40 in FIG. 1, at a furnace temperature of 300° C.

By lowering the temperature of the furnace to 250° C., the conversion rate of carbon was reduced by about 15%.

By using alternating current in the frequency range from 0 to 400 Hz, a slight, but not marked, increase in the conversion rate was detected, when the frequency is increased. The increase is highest in the frequency range from 0 Hz (direct current) to about 20 Hz, whereafter the conversion rate is almost constant.

Example 2

Electrochemical Reactor with Internal Circuit Composed of a Mixed Ion-selective Electrolyte and Electrode Material Heat-treated CGO-powder, produced as described in example 1, was mixed with a similarly heat-treated powder of lanthanum manganite doped with 20 atomic-% strontium from Seattle Specialty Ceramics, Seattle, USA (now: Praxair Specialty Ceramics) (hereinafter designated LSM), which had been heat-treated at 1200° C. for 3 hours. The powder mixture, which contained 6.5 weight % LSM corresponding to about 6 volume %, was pressed to a plate at 100 MPa and sintered at 800° C. for 1 hour. After the sintering, the pore size in the sintered material was 0.4–4 $\mu$m.

The plate was mounted in the same furnace as described in example 1, but without being provided with platinum electrodes, corresponding to the internal circuit shown in FIG. 7.

As current source use was made of a modified frequency converter of brand Lenze from the company Leomotor, Denmark, by which the internal circuit could be applied with a voltage of 1–400 volts at a variable frequency of 0.1–400 Hz, and a power output of 750 Watts.

Figure 12:
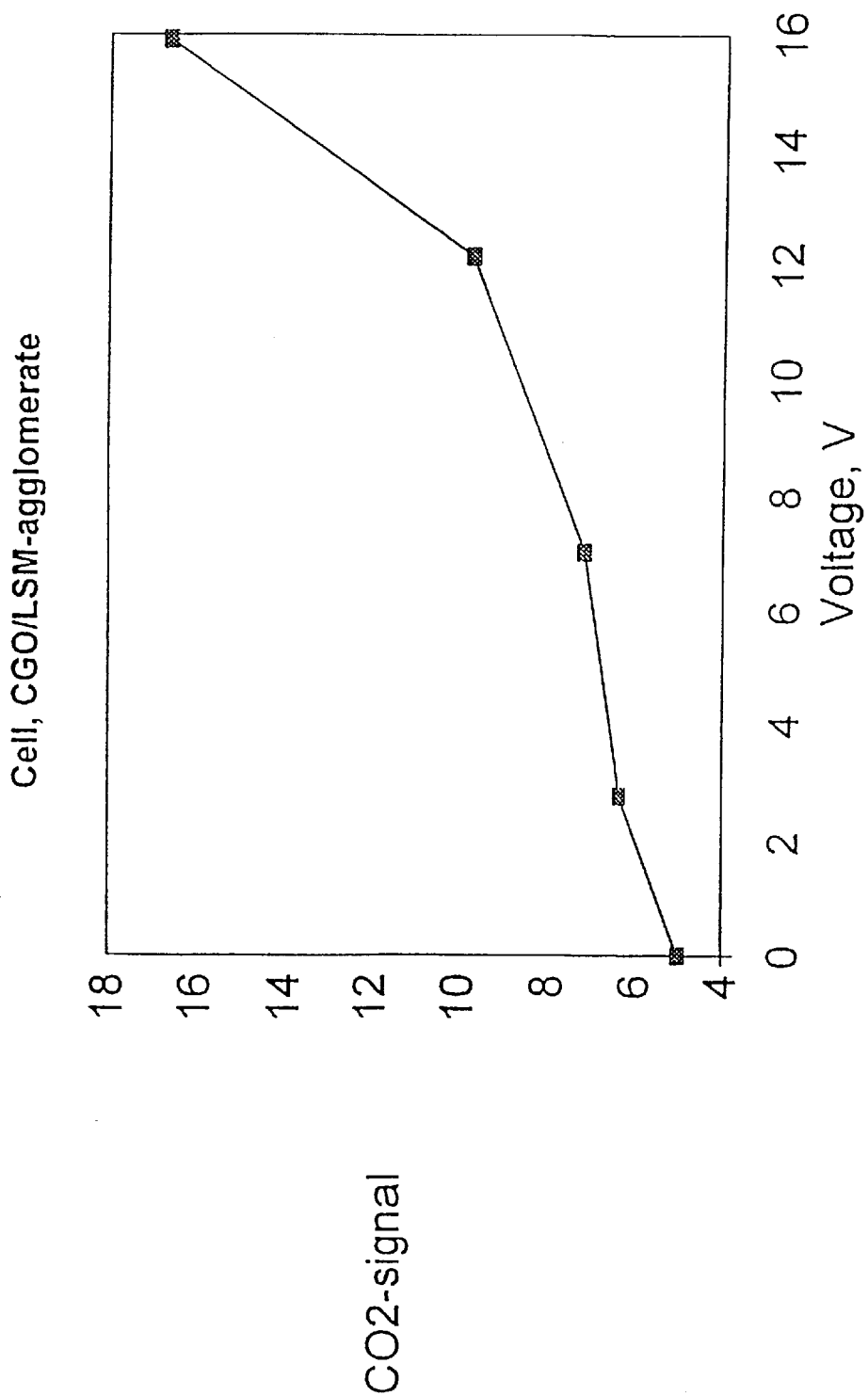

FIG. 12 shows the measured generation of carbon dioxide as function of the applied voltage over the internal circuit.

As expected, a significantly higher voltage level is required over the internal circuit consisting of a porous, mixed ion-selective electrolyte and electrode material than over an internal circuit consisting of an ion-selective electrolyte material sandwiched between a working electrode and a counter-electrode as in example 1.

Also, the reaction rate is higher because of the significantly higher effective surface area, where the reaction can proceed. In the frequency area used, from 0 to 400 Hz, a slight, but not marked increase in the conversion rate is detected, when the frequency is increased. The increase is highest in the frequency area from 0 to about 20 Hz, whereafter the conversion rate is almost constant.

Both in example 1 and in example 2 it could be noted that an increase in the conversion rate results in an increase in the current demand in the internal circuit. The current decreases strongly when the added carbon is fully burnt.

Example 3

Porous Mixture of CGO- and LSM-powder on an Inert Carrier

A mixture of CGO-powder and LSM-powder was prepared as described in example 2. The mixture was dispersed in ethanol using a dispersing agent, KD-4 from the company ICI, whereafter it was deposited on an inert carrier of non-woven quartz fibres. The deposited powder mixture and carrier were then sintered at 800° C. for 2 hours, whereafter both were placed in a furnace, as described in example 1.

Similar results were obtained for the conversion of carbon as for the internal circuit, which was prepared as described in example 2.

Example 4

Electrochemical Reactor with Internal Circuit Constructed of a Mixed Ion Selective Electrolyte- and Electrode Material In this example, cerium oxide doped with 10 atomic gadolinium oxide (afterwards designated as CGO-10) from Praxair Specialty Ceramics, Seattle, USA (former: Seattle Specialty Ceramics) was used as oxide ion conducting electrolyte material. The CGO-10-powder was heat treated at 1500° C. for 3 hours to adjust the particle size. The CGO-10 powder was mixed with 5 weight % LSM-powder corresponding to about 4.5 volume % as described in example 2.

Two plates of 3 mm thickness were pressed from the mixture at a pressure of 65 MPa and sintered at 950° C. for 3 hours.

Figure 13:
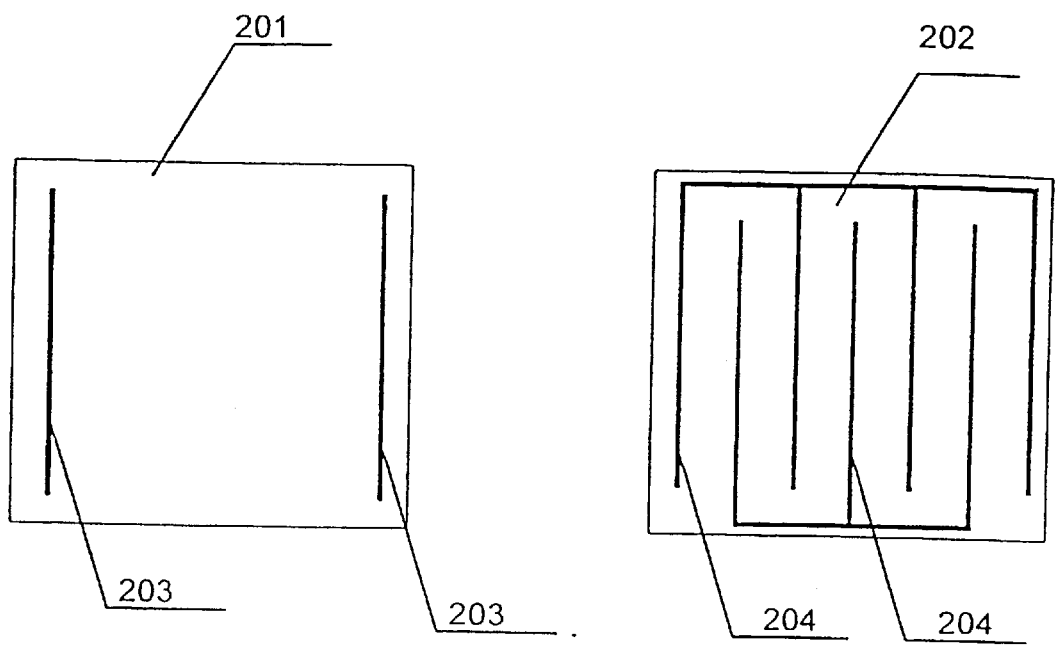
FIG. 13 shows the pattern of silver leads for contacting of the two internal circuits equivalent to that shown in FIG. 7.

The sintered plates were provided with contacts for current leads by painting silver paste (Demetron, Leitsilber 200, Prod. No. 6200 0007) on their surfaces as shown in FIG. 13.

On a first plate 201, the silver leads 203 were placed at opposite edges.

On a second plate 202, the silver leads 204 were placed in an intermittent pattern, providing a significantly shorter current path than that for the first plate 201.

The silver leads were contacted with wire connected to an AC power supply, fixed at 50 Hz and variable from 2 to 250 V (RKT-2, IMPO electronic A/S, Odense, Denmark).

The plates were tested one by one in a furnace as described in example 2.

Soot collected from the exhaust system of a diesel engine was added to the gas stream through the reactor.

The $CO_2$-evolution was monitored by leading the exhaust gas from the reactor (equivalent to the outlet 40 in FIG. 1) through a gas flow-cell in a Fourier transform infrared spectrometer.

Figure 14:
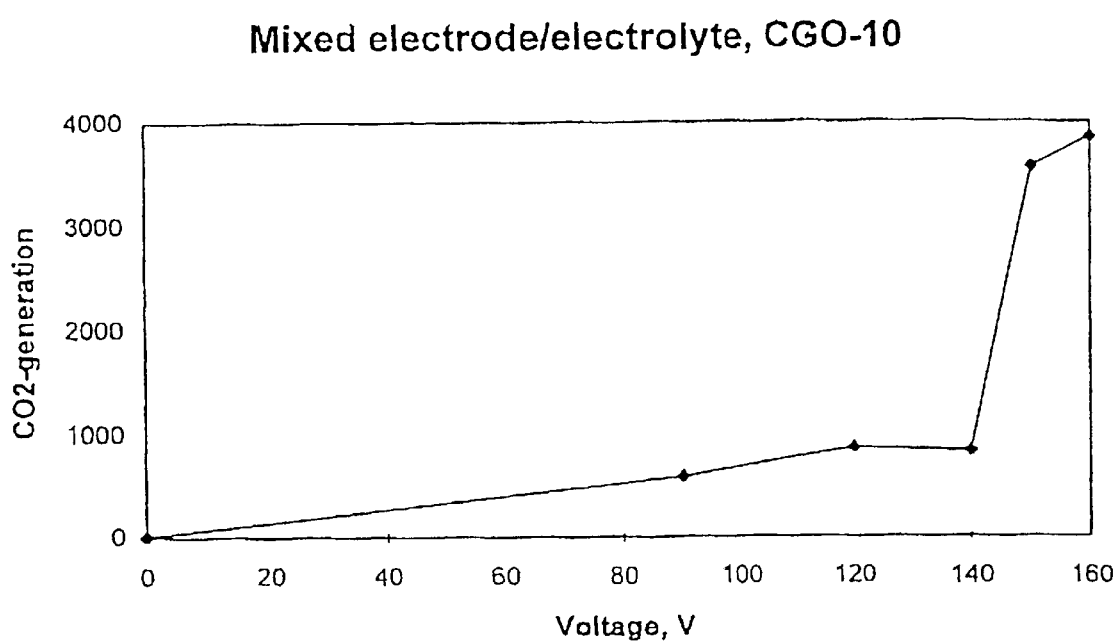
FIG. 14 shows the measured generation of carbon dioxide as a function of the applied AC voltage over one of the internal circuits shown in FIG. 13.

FIG. 14 shows the generation of carbon dioxide as function of the applied 50 Hz AC voltage over the first plate 201.

It is seen that the generation of carbon dioxide increases sharply at a threshold voltage of about 150 V.

Figure 15:
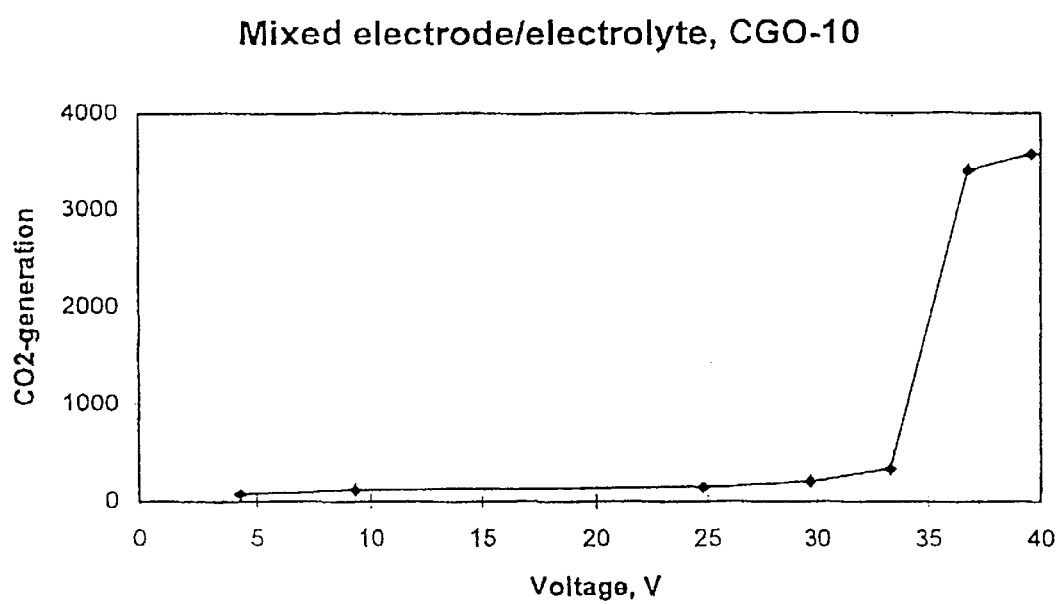
FIG. 15 shows the measured generation of carbon dioxide as a function of the applied AC voltage over the other of the internal circuits shown in FIG. 13.

FIG. 15 shows the generation of carbon dioxide as a function of the applied 50 Hz AC voltage over the second plate 202. It is seen that the generation of carbon dioxide increases sharply at a threshold voltage of about 35 V, i.e. at a lower voltage than for plate 201, corresponding to the shorter current path provided by the intermittent silver lead pattern.

Example 5

Electrochemical Reactor for Purification of Oil in Waste Water

An electrochemical reactor was constructed with an internal circuit comprising a hydrogen ion-conducting selective electrolyte of a perfluorated sulphonate membrane of type Nafion® from the company DuPont. The electrolyte was provided with porous electrodes by painting with platinum paste as described in example 1.

Voltage was applied to the reactor as stated in example 1.

A dispersion of 1% oil in water was conducted through the reactor, the flowing water and the reactor being heated to about 90° C. in a furnace in order hereby to increase the reaction rate. The water could pass the reactor, whereas the oil droplets were trapped and converted electrochemically into carbon dioxide.

It is assumed that the conversion follows the following reaction equations:

Anode: $C_nH_{(2n+2)} + (2n)H_2O = nCO_2 + (6n+2)H^+ + (6n+2)e^-$

Cathode: $\frac{1}{2}(3n+1)O_2 + (6n+2)H^+ + (6n+2)e^- = (3n+1)H_2O$

Total: $C_nH_{(2n+2)} + \frac{1}{2}(3n+1)O_2 = nCO_2 + (n+1)H_2O$

Example 6

Energy Consumption in Operation

To exemplify the energy consumption of a reactor according to the invention in operation, the basis may be a diesel engine, which continuously delivers 180 kW and typically produces 0.3 g soot per kWh corresponding to a soot production m of 0.015 g/s. Assuming a total electrochemical conversion of this amount of soot as pure carbon, the amount of soot using Faraday's constant F and the number of electrons n in the conversion would correspond to the following calculated current through the reactor:

$$I = n*m*F/M_c = 4*0.015*96500/12 = 483 \text{ A}$$

where $M_c$ is the atomic weight of carbon.

At a voltage of 3 V, this corresponds to about 1.5 kW, which is less than 1% of the power output.

I claim:

1. A method for the electrochemical conversion of a material insoluble in a fluid into a material soluble in the fluid, which method comprises:
   (a) flowing the fluid containing the insoluble material into a reaction zone having an internal circuit which includes:
      (i) one or more working electrodes having open through-going cavities therein and being capable of transferring electrons in one or more electrochemical processes which convert the insoluble material into the soluble material,
- (ii) one or more counter-electrodes capable of transferring electrons which counterbalance the electrochemical processes at the one or more working electrodes, and
- (iii) one or more ion-selective electrolytes positioned between and in contact with the one or more working electrodes and the one or more counter-electrodes, for selectively conducting one or more types of ions between the one or more working electrodes and the one or more counter-electrodes, the one or more electrolytes having open through-going cavities therein, so that the introduced insoluble material passes into the cavities in the electrodes and the electrolyte and is brought within an electrochemical reaction distance from the working electrode to enable the electrochemical processes to take place, wherein the working electrode and the counter-electrode are connected to an external current source (b) applying to the internal circuit an electrical voltage difference supplied by the external current source which is sufficient for the electrochemical processes to convert the insoluble material into the soluble material, and (c) conducting the soluble material from the reaction zone with the flowing fluid.

2. The method according to claim 1, wherein the open cavities have one or more closed delimitations and one or more openings, which openings communicate with the fluid.

3. The method according to claim 2, wherein the closed delimitations of the cavities consist of one or more electrode materials, one or more ion-selective electrolyte materials, or a mixture thereof.

4. The method according to claim 2, wherein the closed delimitations of the cavities consist of a mixed ion-selective electrolyte and electrode material.

5. The method according to claim 2, wherein the cavities have a size of 10–100 $\mu$m.

6. The method according to claim 1, wherein the electrochemical processes are selected from the group consisting of electrode processes which are oxidizing, reducing, and a combination thereof.

7. The method according to claim 1, wherein the connection of the working electrode and the counter-electrode to the external current source provides a current of electrons in one direction.

8. The method according to claim 1, wherein the connection of the working electrode and the counter-electrode to the external circuit source provides a current of electrons in alternating current directions.

9. The method according to claim 1, wherein the fluid contains oxygen.

10. The method according to claim 1, wherein the fluid contains water.

11. The method according to claim 1, wherein the material insoluble in the fluid and the fluid consist of one or more two-phase systems, in which one phase is a gas or a liquid, and in which the second phase is a solid or a liquid insoluble in the fluid.

12. The method according to claim 11, wherein the two-phase systems are selected from the group consisting of liquid-in-gas systems, solid-in-gas systems, solid-in-liquid systems, liquid-in-liquid systems, and mixtures thereof.

13. The method according to claim 1, wherein the material insoluble in the fluid consists of soot, and the fluid consists of the exhaust gas from an internal combustion engine.

14. The method according to claim 1, wherein the material insoluble in the fluid consists of oil, and the fluid consists of waste water.

15. The method according to claim 1, wherein the one or more electrolytes contain a solid-state ion conductor.

16. The method according to claim 15, wherein the solid-state ion conductor is oxygen ion-conducting.

17. The method according to claim 15, wherein the solid-state ion conductor consists of cerium dioxide ($CeO_2$) doped with gadolinium oxide ($Gd_2O_3$), zirconium dioxide ($ZrO_2$) doped with yttrium oxide ($Y_2O_3$), or a combination thereof.

18. The method according to claim 15, wherein the solid-state ion conductor is hydrogen ion-conducting.

19. The method according to claim 15, wherein the solid-state ion conductor consists of $\beta$"-alumina.

20. The method according to claim 15, wherein the solid-state ion conductor consists of a sulphonated perfluoropolymer.

21. The method according to claim 15, wherein the solid-state ion conductor has open cavities having a size of 10–100 $\mu$m.

22. The method according to claim 15, wherein either or both of the working electrodes and the counter-electrodes have cavities having a size of 10–100 $\mu$m.

23. The method according to claim 1, wherein either or both of the working electrodes and the counter-electrodes are formed of an electrically conducting material selected from the group consisting of metals and ceramic materials.

24. The method according to claim 23, wherein the electrically conducting material is lanthanum manganite doped with strontium.

25. The method according to claim 1, wherein the internal circuit is produced by a method which includes mixing an ion-selective electrolyte material having a grain size of 10–100 $\mu$m with an electrode material having a grain size of 1–10 $\mu$m and in proportions allowing the electrode material grains to be positioned essentially on the surface of the ion-selective electrolyte material grains without touching each other, so as to obtain an electrical conductivity of the mixed material which is of the same order of magnitude as the conductivity of the ion-selective electrolyte material.

26. The method according to claim 25, wherein the internal circuit contains less than 20 vol.-% of the electrode material.

27. The method according to claim 25, wherein the mixed ion-selective electrolyte and electrode material has open cavities having a size of 10–100 $\mu$m.

28. The method according to claim 25, wherein the internal circuit, in the direction in which it extends, has a decreasing pore size of 100–10 $\mu$m.

29. An electrochemical reactor for conversion of a material insoluble in a fluid into a material soluble in the fluid, which reactor comprises:
- a reaction chamber having an inlet for introduction of a fluid, and an outlet for discharge of the introduced fluid, in which reaction chamber there is situated a reaction section which includes an internal circuit having:
  - (a) one or more working electrodes having open through-going cavities therein and being capable of transferring electrons in one or more electrochemical processes which convert the insoluble material into a material soluble in the fluid,
  - (b) one or more counter-electrodes capable of transferring electrons in the electrochemical processes, which counter balance the electrochemical processes at the one or more working electrode, and (c) one or more ion-selective electrolytes positioned between and in contact with the one or more working electrodes and the one or more counter-electrodes for selectively conducting one or more types of ions between the one or more working electrodes and the one or more counter-electrodes, the one or more electrolytes having open through-going cavities therein, so that the introduced insoluble material passes into the cavities in the electrodes and the electrolytes and is brought within an electrochemical reaction distance from the working electrode to enable the electrochemical processes to proceed, and wherein the internal circuit is coupled via the working electrode and the counter-electrode to an external current source.

30. The reactor according to claim 29, wherein the open cavities have one or more closed delimitations and one or more openings which communicate with the fluid.

31. The reactor according to claim 30, wherein the closed delimitations of the cavities consist of one or more electrode materials, one or more ion-selective electrolyte materials, or mixtures thereof.

32. The reactor according to claim 30, wherein the closed delimitations of the cavities consist of a mixed ion-selective electrolyte and electrode material.

33. The reactor according to claim 30, wherein the cavities have a size of 10–100 $\mu$m.

34. The reactor according to claim 29, wherein the current source is a direct current source.

35. The reactor according to claim 29, wherein the current source is an alternating current source.

36. The reactor according to claim 29, wherein the ion-selective electrolyte includes a solid-state ion conductor.

37. The reactor according to claim 36, wherein the solid-state ion conductor is oxygen ion-conducting.

38. The reactor according to claim 36, wherein the solid-state ion conductor is, cerium dioxide ($CeO_2$) doped with gadolinium oxide ($Gd_2O_3$), zirconium dioxide ($ZrO_2$) doped with yttrium oxide ($Y_2O_3$), or a combination thereof.

39. The reactor according to claim 36, wherein the solid-state ion conductor is hydrogen ion-conducting.

40. The reactor according to claim 36, wherein the solid-state ion conductor is $\beta$"-alumina.

41. The reactor according to claim 36, wherein the solid-state ion conductor is a sulphonated perfluoropolymer.

42. The reactor according to claim 36, wherein the solid-state ion conductor has open cavities having a size of 10–100 $\mu$m.

43. The reactor according to claim 29, wherein the working electrodes, counter-electrodes, or both, contain an electrically conducting material selected from metals or ceramic materials.

44. The reactor according to claim 43, wherein the working electrodes, the counter-electrode, or both, have cavities having a size of 10–100 $\mu$m.

45. The reactor according to claim 43, wherein the electrically conducting material is lanthanum manganite doped with strontium.

46. The reactor according to claim 29, wherein the internal circuit is produced by a method including mixing an ion-selective electrolyte material having a grain size of 10–100 $\mu$m with an electrode material having a grain size of 1–10 $\mu$m and in proportions allowing the electrode material grains to be positioned essentially on the surface of the ion selective electrolyte material grains without touching each other, so that the mixture has an electrical conductivity of the mixed material, which is of the same order of magnitude as the conductivity of the ion-selective electrolyte material.

47. The reactor according to claim 46, wherein the internal circuit contains less than 20 vol.-% of the electrode material.

48. The reactor according to claim 46, wherein the mixed material has open cavities having a size of 10–100 $\mu$m.

49. The reactor according to claim 46, wherein the internal circuit, in the direction in which it extends, has a decreasing pore size of 100–10 $\mu$m.

50. A method for removal of soot particles from flue gases comprising introducing a flue gas containing soot particles into the electrochemical reactor according to claim 29, and converting the soot particles into a material soluble in the flue gas.

51. A method for removal of oil from waste water comprising introducing waste water containing oil into the electrochemical reactor according to claim 29 and converting the oil into a material soluble in the waste water.

* * * * *